US005762804A

United States Patent [19]

Striefler

[11] Patent Number: 5,762,804
[45] Date of Patent: Jun. 9, 1998

[54] FILTER PREWETTING AND DECONTAMINATION METHOD AND APPARATUS

[76] Inventor: Martin J. Striefler, 376 Lower Rd., New Hampton, N.Y. 10958

[21] Appl. No.: 679,528

[22] Filed: Jul. 12, 1996

[51] Int. Cl.⁶ .................................................. B01D 65/02
[52] U.S. Cl. ......................... 210/636; 73/40; 141/85; 141/94; 210/321.69; 264/39; 264/48; 422/3; 422/106; 422/116
[58] Field of Search ............... 73/38, 40; 210/321.69, 210/490, 500.27, 500.38, 500.39, 500.42, 636, 637, 651, 500.37, 500.36, 541, 739; 264/41, 39, 48; 425/445, 446, 474; 137/571, 572; 141/69, 85, 94; 422/1, 3, 105, 106, 116

[56] References Cited

U.S. PATENT DOCUMENTS

| | | | |
|---|---|---|---|
| 3,524,757 | 8/1970 | Havens | 264/41 |
| 3,642,773 | 2/1972 | Littman | 210/500.3 |
| 3,647,521 | 3/1972 | Tulin | |
| 3,674,722 | 7/1972 | Rainer et al. | |
| 3,940,336 | 2/1976 | Macevicz et al. | 210/81 |
| 4,003,392 | 1/1977 | Schaefer | 134/30 |
| 4,136,025 | 1/1979 | Zwack et al. | |
| 4,238,244 | 12/1980 | Banks | 132/22 R |
| 4,332,264 | 6/1982 | Gortz et al. | 134/57 R |
| 4,430,213 | 2/1984 | Ishikawa | 210/136 |
| 4,736,758 | 4/1988 | Kusuhara | 134/66 |
| 4,770,778 | 9/1988 | Yokoyama et al. | 210/321.79 |
| 4,778,532 | 10/1988 | McConnell et al. | 134/10 |
| 4,856,544 | 8/1989 | McConnell | 134/95 |
| 4,872,974 | 10/1989 | Hirayama et al. | 210/90 |
| 4,874,516 | 10/1989 | Kondo | 210/490 |
| 4,881,176 | 11/1989 | Kononov | 73/38 |
| 5,198,116 | 3/1993 | Comstock et al. | 210/636 |
| 5,353,630 | 10/1994 | Soda et al. | 73/38 |
| 5,417,101 | 5/1995 | Weich | 73/38 |
| 5,507,959 | 4/1996 | Glick | 210/797 |

*Primary Examiner*—Joseph W. Drodge
*Attorney, Agent, or Firm*—Thomas L. Adams

[57] ABSTRACT

Apparatus can prewet at least one filter with a supply of liquid and a supply of wetting agent. The apparatus has a container for holding at least the one filter. The apparatus also has a flow arrangement including a circulating subsystem and flushing subsystem. The circulating subsystem is connected to the container and the supply of wetting agent for: (a) circulating the wetting agent through the container during an initial phase, and (b) draining the wetting agent during a subsequent phase back to the supply of liquid. The flushing subsystem is connected to the container and is adapted to be coupled to the supply of liquid for flushing the liquid through the container. After loading a filter into the container, wetting agent is circulated through the container in the initial phase. Then the wetting agent is drained back to the supply of liquid in the subsequent phase. The liquid is flushed through the container without reopening the container, before removing the filter from the container.

44 Claims, 4 Drawing Sheets

FILTER PREWETTING AND DECONTAMINATION METHOD AND APPARATUS

BACKGROUND OF THE INVENTION

1. Field of the Invention

The present invention relates to an apparatus and method for prewetting filters and, in particular, to a system employing a wetting agent and a flushing liquid.

2. Description of Related Art

Known hydrophobic filters used in aqueous solution must be prewetted prior to use. Such filters are not easily wetted because of their hydrophobic filter elements. Therefore, a wetting agent having a surface tension lower than water can be used to initially wet the filter. A commonly used technique is immersing the filter in isopropyl alcohol until the filter is wet. After wetting, the filter can be removed from the alcohol bath and drained as much as possible. The filter can then be flushed with deionized water. The flushing can be performed either by soaking the filter in a bath of deionized water for at least one half hour or by a stream of deionized water flowing at 1 gallon per minute for 10 minutes.

Flushing the filter with water is critical since a wetting agent such as alcohol must be thoroughly removed from the filter before placing it in use, otherwise alcohol contamination can occur. A disadvantage with the foregoing method is the large amount of technician time required to prewet the filter.

Another known method of prewetting a filter is to place the filter in a container and force deionized water through the filter at high pressure, for example, 650 PSIG. These known systems demand much operator time and are limited to one specific type of filter. Also, driving liquid through a filter at high pressure, raises a serious risk of damaging the filter membrane. Furthermore, forcing water, even at high pressure, has not proved to be a reliable way of prewetting a filter. Some units do not actually wet.

In other known methods, the filter is placed in a housing and alcohol is forced through the filter. Thereafter, the filter is removed from the housing and placed into another housing through which water is forced. The foregoing has the disadvantage of employing multiple, dedicated filter housings so that only a single type of filter can be handled, one filter at a time. Furthermore, the need to handle the filter by moving it from housing to housing requires much operator involvement. Furthermore, the operator must start and stop each phase of the process by operating the appropriate valves. This method is time consuming and prone to operator error.

See also U.S. Pat. Nos. 3,674,722; 3,647,521; 4,003,392; 4,736,758; 3,940,336; 4,136,025; 4,238,244; and 4,778,532.

One known system for prewetting a PTFE filter is shown in U.S. Pat. No. 5,507,959. That system shows a system of valves for directing either isopropyl alcohol (IPA) or ultra-purified water through a filter. In either event, the fluid passes through the filter and is discharged to an outlet. There is no circulation described for this system and the IPA may be consumed or wasted. This known system includes a subsystem for testing filter integrity. Other systems for testing the integrity of various types of filters are shown, for example, in U.S. Pat. Nos. 5,353,630 and 5,417,101. Various types of ultra-filtration filters are shown in U.S. Pat. Nos. 4,430,213; 4,770,778; and 4,874,516. See also U.S. Pat. No. 5,198,116.

It is believed that prior commercially available units have circulated IPA in a loop that included a tank for storing IPA. That system operated to automatically cycle IPA before passing deionized water through a hydrophobic filter.

These known system do not place a high enough priority on conserving the IPA. After the filter canister is filled with IPA, the IPA is simply flushed out of the filter and discarded by introducing ultra-pure or de-ionized water.

Apparatus has been developed for testing various types of membrane filters under the control of a microcomputer. For example, U.S. Pat. No. 4,872,974 shows a process in which steam sterilization is followed by the injection of air before the wetting of a filter in a rinse cycle. This known system however, is unconcerned with systems of the type designed to efficiently and quickly and prewet a hydrophobic filter. Thus this reference is irrelevant. See also U.S. Pat. Nos. 4,332,264 and 4,856,544.

Accordingly, there is a need for an improved way of prewetting filters that is efficient, effective and adaptable.

SUMMARY OF THE INVENTION

In accordance with the illustrative embodiments demonstrating features and advantages of the present invention, there is provided an apparatus for prewetting at least one filter with a supply of liquid and a supply of wetting agent. The apparatus includes a container means for holding at least the one filter. Also included is a flow arrangement comprising a circulating means and a flushing means. The circulating means is connected to the container means and the supply of wetting agent for: (a) circulating the wetting agent through the container means during an initial phase, and (b) draining the wetting agent during a subsequent phase back to the supply of liquid. The flushing means is connected to the container means and is adapted to be coupled to the supply of liquid for flushing the liquid through the container means.

According to another aspect of the invention a method is provided for prewetting at least one filter in a container assembly with a supply of liquid and a supply of wetting agent. The method includes the step of loading a filter in the container assembly. Another step is circulating the wetting agent through the container assembly in an initial phase. The method includes the step of draining the wetting agent back to the supply of liquid in a subsequent phase;. Also included is the step of flushing the liquid through the container assembly without reopening the container assembly. The method also includes the step of removing the filter from the container assembly.

By employing apparatus and methods of the foregoing type, improved prewetting of a filter is achieved. In a preferred embodiment, one or more filters may be connected in parallel in a circuit employing a storage vessel containing IPA. A pump is used to pump IPA or deionized water. This preferred system is controlled by a programmable logic controller that is preprogrammed to close certain valves in the system in sequence to perform a prewetting and a flushing operation.

In the preferred system the valves are first closed to place the pump in a circuit with the filters and a storage tank of IPA. Accordingly, the IPA is drawn from the storage tank and circulates through the filters. Since the IPA is returned, this resource is conserved.

After the initial IPA phase, the preferred system automatically changes to a drain phase, where the pump now draws the remaining IPA from the filters and returns it to the storage tank. This further conserves the IPA.

In the next phase, the preferred system automatically switches the pump into an open loop configuration, where deionized water is pumped from an inlet through the filters and then to an outlet, without circulating through a storage tank is not used. The resistivity of the deionized water can be measured to determine whether sufficient water has been flushed through the system to remove the IPA.

In a final stage, the system is automatically reconfigured to pump the deionized water in a cycle through the filter systems, but the outlet of the filter is also connected to bleed the deionized water from the system and eventually drain the filters and allow the operator to remove the prewetted filters.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
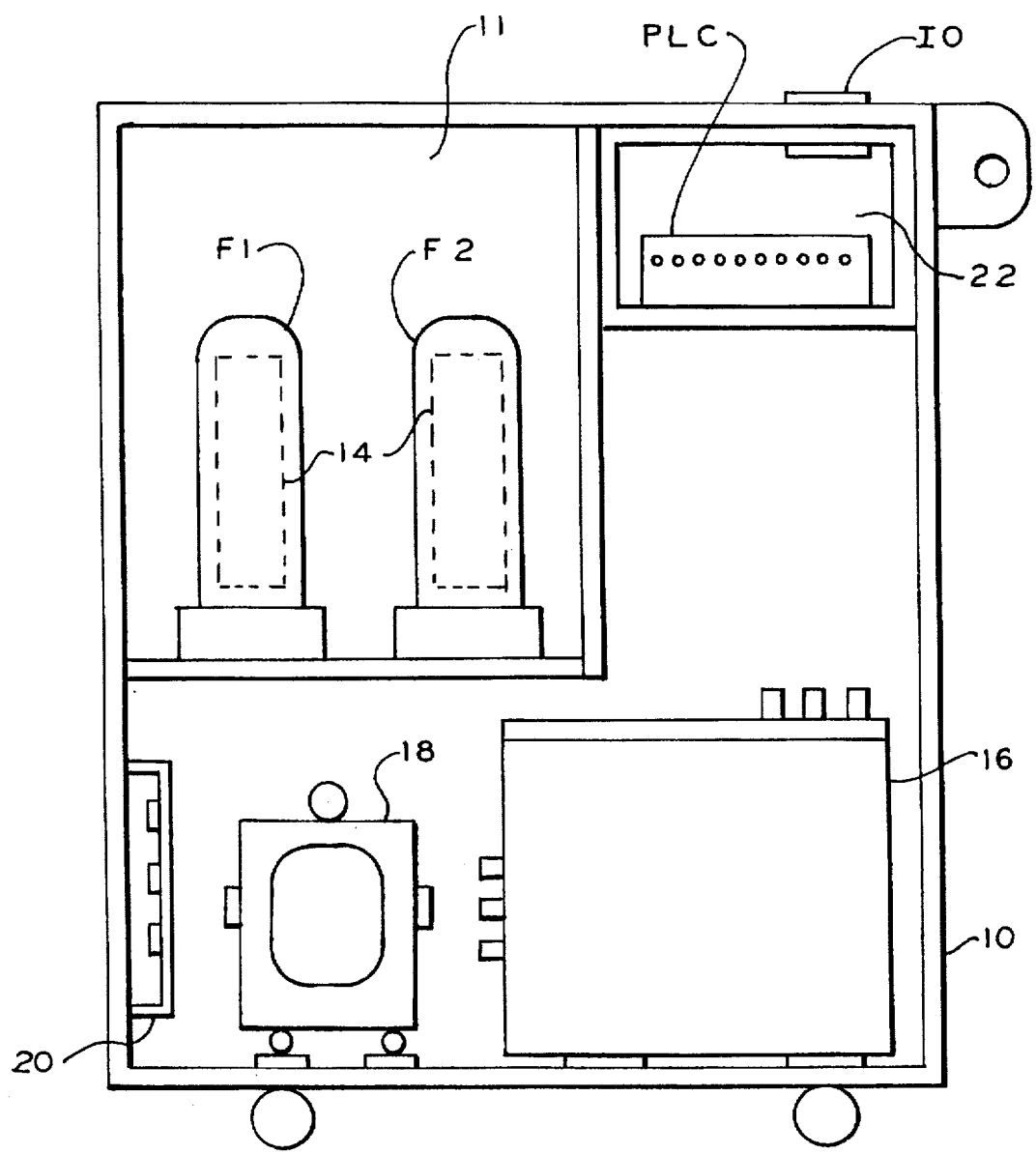
FIG. 1 is a simplified elevational view of an apparatus for prewetting filters in accordance with the principles of the present invention.

Referring to FIG. 1, a cart 10 is shown having a compartment 11 containing a number of filter canisters 12, for example, four canisters. This container assembly (also referred to as a container means) can hold one or more hydrophobic or ultrafiltration filters 14, such as those used in the semiconductor industry. Such filters need to be wetted before being placed into operation (filters 14).

The cart 10 also contains a storage vessel 16 that holds a supply of wetting agent such as isopropyl alcohol (IPA), and thereby acts as a reservoir of IPA. Reservoir 16 may contain 10 gallons of IPA although other volumes are anticipated. Also mounted inside cart 10 is a pump 18 designed to pump water or IPA at a pressure and volume appropriate for the operations hereinafter described.

The illustration of FIG. 1 is simplified in that a number of valves and pipes that are actually inside the cart (described hereinafter) are not shown for clarity of illustration. The various pipes and valves are connected to inlets and outlets generally shown herein as a facility connection area 20.

Mounted in an upper compartment 22 of cart 10 is a control means, shown herein as programmable logic controller PLC. The controller PLC can be any one of a variety of microcomputer assemblies designed to control processes. The control means PLC connects to a touch pad screen (also referred to as a keyboard) IO, which is described hereinafter in further detail.

Figure 2:
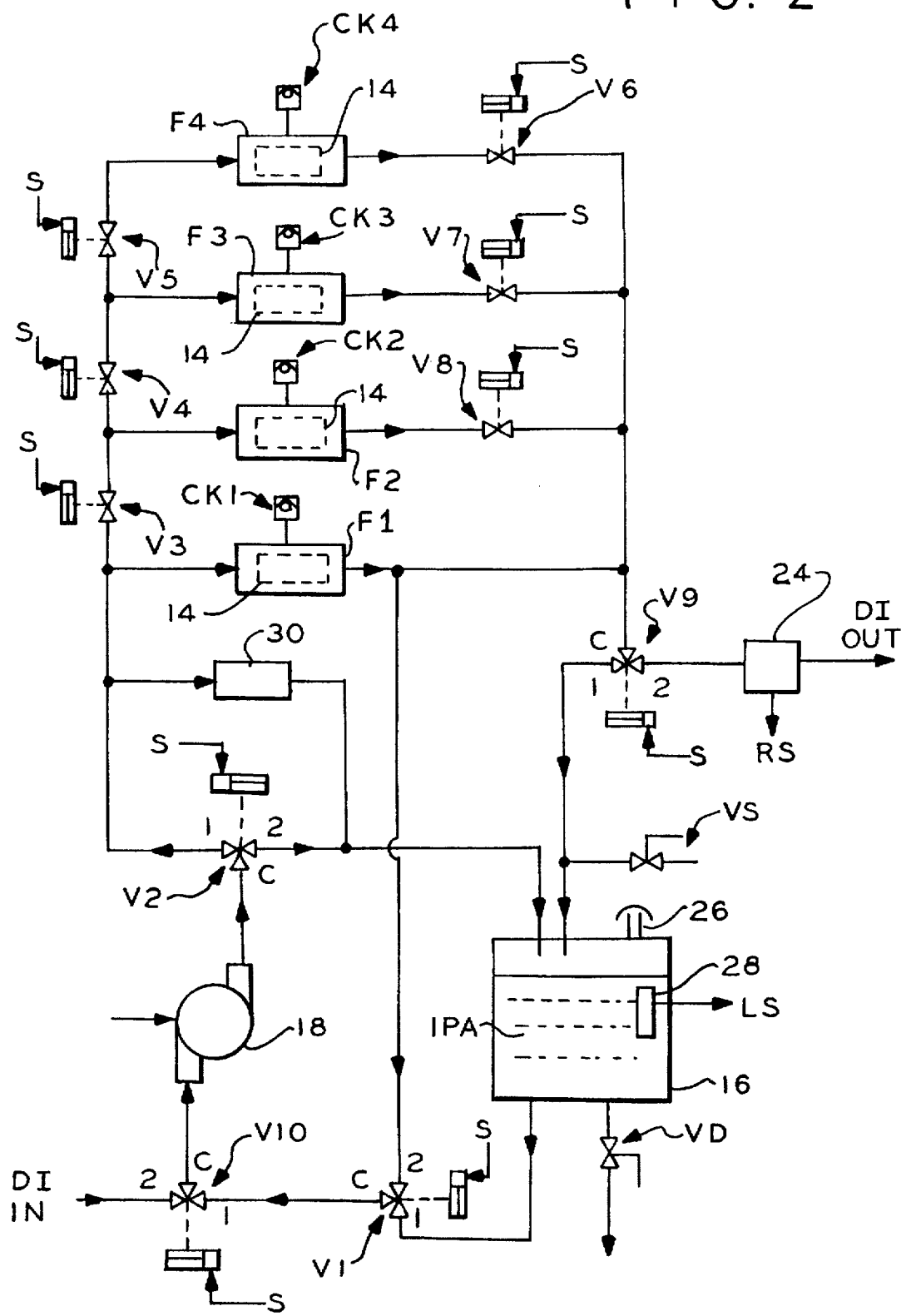
FIG. 2 is a schematic hydraulic diagram of the apparatus of FIG. 1.

Referring to FIG. 2, the apparatus of FIG. 1 is shown in further schematic detail. Previously mentioned pump 18 is shown with its intake connected to common port C of three-way valve V10 and its discharge connected to common port C of three-way valve V2. These three-way valves are constructed to be switched into one of three states: (a) an off state where no fluid passes through the valve; (b) a first state where fluid can pass between common port C and port 1; and (c) a second state where fluid passes between common port C and port 2. These three-way valves are pneumatically operated system valves that are controlled by a solenoid operated air valve (described further hereinafter), which provides a control signal on line S to set the state of the valve. The three states are controlled by applying an appropriate pressure to line S.

Port 1 of valve V2 is shown connected to (a) the inlet of previously illustrated filter canister F1; and (b) one port of block valve V3, whose other port connects to the inlet of filter canister F2. Valve V3 is another pneumatically operated system valve, wherein pressure applied on control line S can open and close the valve.

The inlet of filter canister F3 is connected through valve V4 to the inlet of canister F2. Furthermore, the inlet of filter canister F4 is connected through valve V5 to the inlet of filter canister F3. The valves V3, V4 and V5 are built the same. Also, each of the canisters F1, F2, F3, and F4 are constructed the same and each can contain a filter 14. Each of the filter canisters F1 through F4 has a vent line which is connected to a check valve CK1, CK2, CK3, CK4, respectively (these check valves are also referred to as a vent means).

The outlet of filter canister F1 connects to the common port C of valve V9. The outlets of filter canisters F2, F3 and F4 connect through valves V8, V7 and V6, respectively, to the common port C of valve V9. Valves V6, V7 and V8 are built the same as valves V3, V4 and V5. As described further hereinafter, valve V3 and V8 work synchronously to place filter canister F2 in parallel with filter canister F1; otherwise filter canister F2 is isolated from the rest of the system. In this sense, valves V3 and V8 act as a selection means.

Similarly functioning pairs of valves are valves V4 and V7, as well as valves V5 and V6, which also operate to selectively place filter canisters in parallel and therefore act as a selection means, as well.

The common port C of valve V9 also connects to port 2 of valve V1, whose common port C connects to port 1 of previously mentioned valve V10. Valves V1, V2, V9 and V10 are all the same type of valve.

Port 2 of valve V10 is connected to a supply of liquid (for example, deionized water) and this line is marked DI IN. Port 2 of valve V9 connects through a resistivity sensor 24, whose outlet is labeled DI OUT. As explained hereinafter, the resistivity of deionized water is measured by sensor 24, which then produces a resistivity signal RS used for purposes to be described presently.

Port 1 of valve V9 and port 2 of valve V2 both connect to separate return lines that communicate with the overhead space of previously illustrated storage vessel 16, which contains isopropyl alcohol (IPA). Excessive pressure at the inlet of filter canister F1 can be shunted to the overhead of vessel 16 by pressure regulator 30, which connects between the inlet of filter canister F1 and the port 2 of valve V2.

Vessel 16 is also vented by vent stack 26. Wetting agent can be supplied from the bottom of vessel 16 to port 1 of valve V1. The level of wetting agent in vessel 16 is detected by level means 28, which produces a level signal LS indicating when the wetting agent level in vessel 16 is too low.

Level means 28 can be a simple resistivity detector that senses when the IPA level has reached the sensor. Alternatively, sensor means 28 may contain a float-operated switch that is actuated when the level inside vessel 16 changes.

Samples can be taken of the wetting agent returning to vessel 16, by using manual sample valve VS. Also vessel 16 can be drained using manual block valve VD.

The pump 18 and the storage vessel 16 together with the valves directly connected thereto are herein referred to as a flow arrangement. For reasons to be described presently, this flow arrangement may be considered to include a circulating means for circulating the wetting agent (IPA) in vessel 16. Thus in this sense vessel 16 may be considered part of this circulating means. This flow arrangement is also deemed to include a flushing means for flushing liquid from line DI IN through the various filter canisters. In that sense, the line DI IN may be considered part of the flushing means. Conceptually, however, the pump and the valves directly associated therewith function alternatively as part of the flushing means or the circulating means and can therefore be most simply considered part of the flow arrangement.

Alternatively, the foregoing system of three-way and two-way valves can be modified. While some of the above valves can provide flow paths in multiple phases of operation, in other embodiments the valves can be dedicated to single phases. On the other hand in some embodiments, the valves may be made more versatile and provide a flow path for more phases than illustrated.

Figure 3:
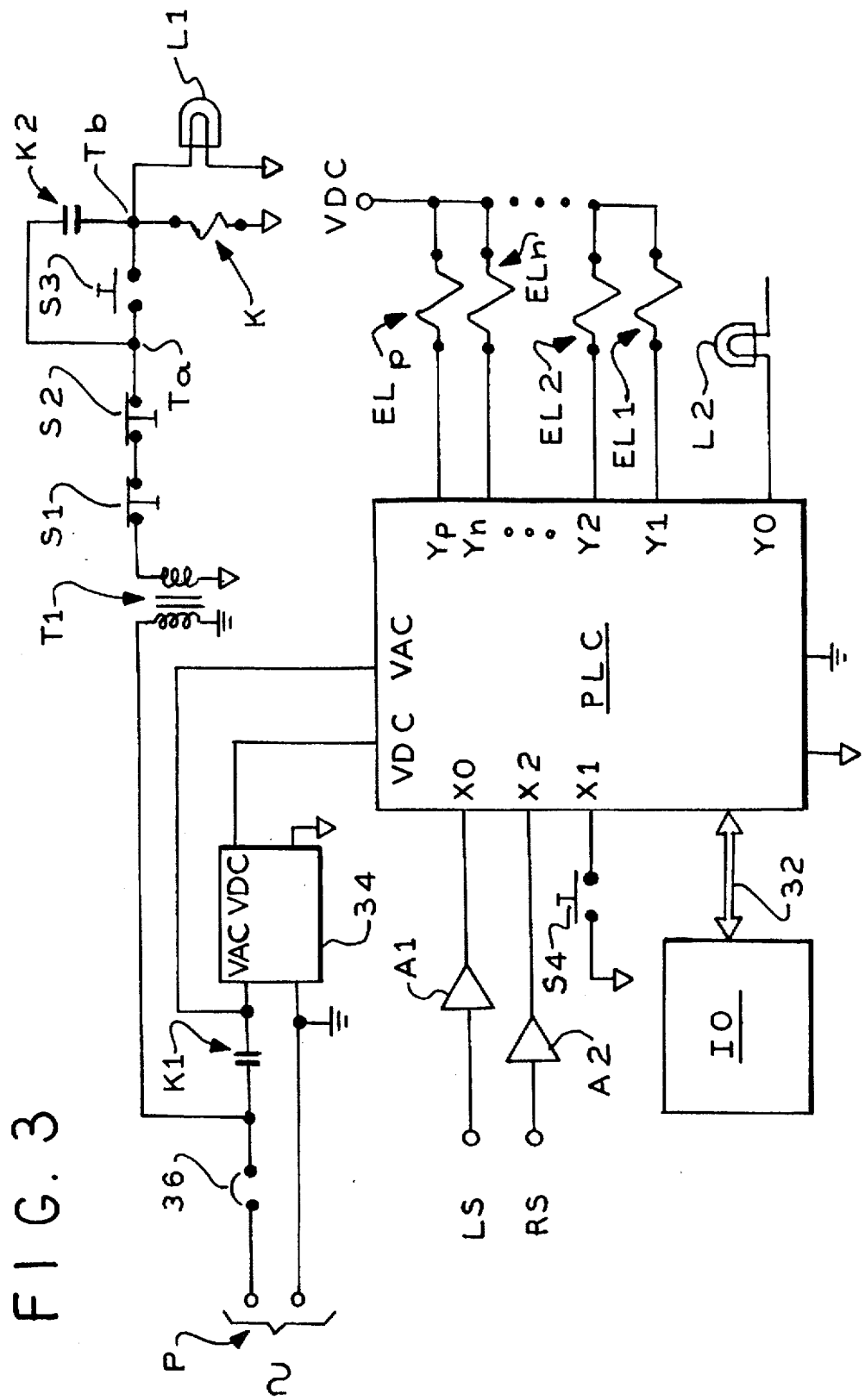
FIG. 3 is an electronic schematic for the control means of FIGS. 1 and 2.

Referring to FIG. 3, previously mentioned programmable logic controller PLC is shown connected through bus 32 to touch pad screen IO also previously illustrated. Components PLC and IO are commercially available process controllers manufactured by Mitsubishi and sold as Model No. FXO-3MR-ES.

Instead of this controller, other embodiments may employ various types of microcomputers or more general purpose computers can be used instead. Alternatively, some simplified machines may employ mechanical timers and combinational logic of a more elementary type to provide a less complicated method of control.

Controller PLC is supplied at terminal VDC with a supply voltage from power supply 34. Power supply 34 is itself powered by alternating current applied thereto at its terminal VAC. This alternating current is also supplied to terminal VAC of controller PLC.

Power is supplied to terminal VAC of power supply 34 through normally open relay contacts K1, which are serially connected through circuit breaker 36 to the utility power lines P. Circuit breaker 36 also supplies voltage to the primary of step-down transformer T1, whose secondary is connected through serially connected, momentary, normally closed, "off" switches S1 and S2 to terminal Ta. Normally open, momentary, "on" switch S3 is connected in parallel with normally open relay contacts K2 between terminals Ta and Tb. On/off lamp L1 is connected from terminal Tb to ground and is in parallel with the relay coil K which operates previously mentioned contacts relay contacts K1 and K2.

Configured in this fashion, momentary depression of "on" switch S3 draws power from the circuit breaker 36 through transformer T1 to the relay coil K1, thereby closing relay contacts K1 and K2. The closure of contacts K2 shorts switch S3, which may then be released and relay coil K will be held on in a bootstrap configuration. At the same time, relay contacts K1 close to supply power to power supply 34, which then provides a DC (direct current) potential such as positive 15 volts to terminal VDC of controller PLC. To disable the power, one need only momentarily depress either one of normally closed switches S1 and S2, which are used as a "normal" or an "emergency" off switch.

Controller PLC operates as a programmable means, which responds to data inputs applied to terminals X0, X1 and X2. A normally open, momentary switch S4 is connected between terminal X1 and ground to function as a manually actuatable means for starting and stopping the system. Terminals X0 and X2 receive input signals from a signaling means, shown herein as amplifiers A1 and A2, whose outputs are connected to previously mentioned terminals LS and RS (the outputs of the level sensor and the resistivity sensor, respectively).

Controller PLC also has a number of programmable outputs. For example, terminal Y0 is shown connected through "run" lamp L2 to previously mentioned potential VDC. Lamp L2 may be programmed to illuminate whenever the system is operating. Outputs Y1, Y2, ... Yn are shown connected to a number of solenoid coils EL1, EL2, ... ELn. These solenoids operate pneumatic valves that, in turn, operate valves V1 through V10 of FIG. 2. This assembly may be obtained from manufacturer SMC, as model No. VV3Q11-12CS1-D (12 station). Output YP is shown connected through solenoid coil ELp to potential VDC. Coil ELp operates a pneumatic valve, which then supplies pneumatic operating pressure to the previously illustrated pump (pump 18 of FIG. 2).

To facilitate an understanding of the principles associated with the foregoing apparatus of FIGS. 1–3, its operation will be briefly described in connection with the flowchart of FIG. 4. It will be understood that the PLC is programmable with ladder logic statements that control the response of the output lines depending upon the inputs and depending upon timers and sequences preprogrammed into controller PLC.

Power is applied to the system by depressing on switch S3 (FIG. 3). As described previously, voltage from utility lines P is then applied through circuit breaker 36, step down transformer T1 and switches S1, S2 and S3 to relay coil K. This closes normally open contacts K2 and K1. Consequently, bootstrap contacts K2 keep relay coil K energized, while normally open contacts K1 supply line voltage to the power supply 34, which in turn supplies power to the programmable logic controller PLC.

Figure 4:
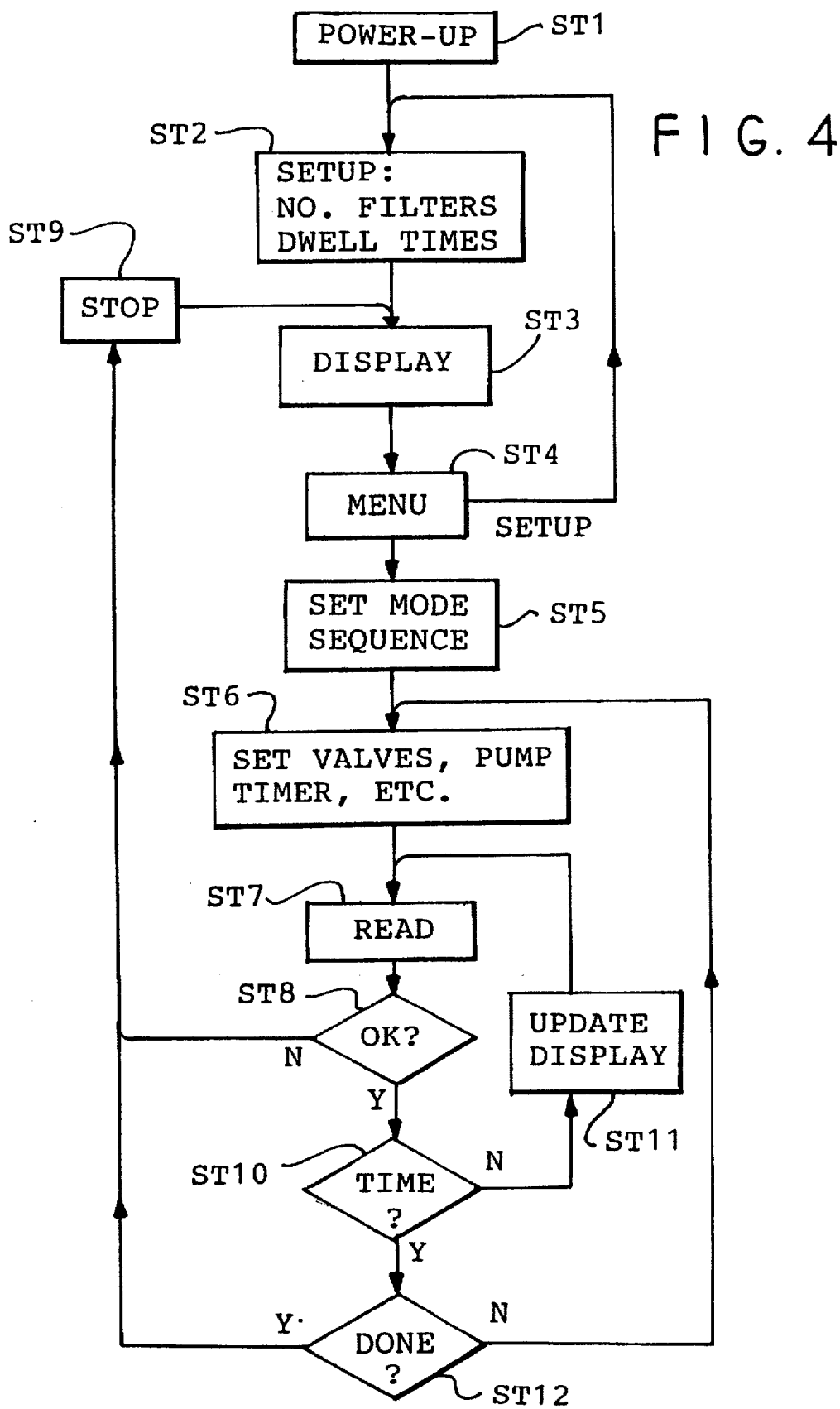
FIG. 4 is a flow chart representing the programming associated with the programmable logic controller of FIG. 3.

Controller PLC has been preprogrammed to first perform step ST1 of FIG. 4. In this step, the program sets certain registers in controller PLC to their start-up values. Also, the various inputs on terminals X0, X1 and X2 are read for initial conditions. Furthermore, the solenoids on lines Y1 ... Yn and YP are set to their initial values.

At this time, controller PLC can send a display signal along bus 32 to the touch pad screen IO (FIG. 3) indicating the initializing mode is taking place.

Thereafter in step ST2 (FIG. 4) controller PLC enters a set up mode. In this mode, controller PLC will display certain questions concerning the desired mode of operation. For example, the display can ask about the number of filters to be treated. In response the operator can manipulate the key pad IO to increment a displayed number indicating the number of filters to be treated.

Thereafter, using a similar display, the operator can answer questions regarding the length of time for various phases of operation, which phases are to be described presently.

Next in step ST3, controller PLC will display a message indicating the system is ready to run and will display various options. At step ST4 the operator may wish to reconsider the set up options and manipulate the key pad IO (FIG. 3) to return the system to the set up step ST2.

If instead the operator elects to prewet or otherwise treat a filter, a message will be delivered indicating that the filters must be installed and the canisters secured, before proceeding further. Unless already done, the operator will now remove canisters F1 (or as appropriate canisters F2, F3 and/or F4) and install a filter 14. Once the filter 14 is installed, canisters F1–F4 are closed, sealed and secured. Thereafter, in step ST4, the operator will indicate a desire to treat a filter.

Next in step ST5, the operator can set the mode of operation. The normal mode of operation as described presently, will cause circulation of IPA through the filters followed by a drain cycle, before flushing deionized water through the filters and then finally draining them. It is assumed now that the operator chooses this normal sequence.

Nothing further happens now until the operator depresses the run switch S4 (FIG. 3). When the controller PLC senses closure of run switch S4 control is transferred to step ST6. In this step a software timer is set for timing the duration of the current phase. Also, the various solenoids EL1 through ELn are operated as appropriate. These solenoids are actuated as needed to control the system valves as indicated in Table 1, below. This starts an initial, IPA flush phase, so that the valves V1, V2, V9 and V10 close as indicated in the first status column of Table 1. Specifically, valves V1, V2, V9 and V10 communicate between common port C and port 1. Also at this time lamp L2 is illuminated to indicate that the system is now running. Finally, the solenoid ELp (FIG. 3) is energized to operate a solenoid controlled pneumatic valve to provide pneumatic power to pump 18 (FIG. 2).

TABLE 1

| VALVE | IPA | | DI | |
|---|---|---|---|---|
| | 1. FLUSH | 2. DRAIN | 3. FLUSH | 4. DRAIN |
| V1 | 1-C | 2-C | off | 2-C |
| V2 | C-1 | C-2 | C-1 | C-1 |
| V9 | C-1 | off | C-2 | C-2 |
| V10 | 1-C | 1-C | 2-C | 1-C |

Also at this time the system determines the number of filters that are to be treated. If only one filter is to be treated then valves V1–V8 are kept open. If two filters are to be treated, then valves V3 and V8 open. For the treatment of three filters, valves V3, V4, V7 and V8 open. If four filters are to be treated all of the valves V3 through V8 open. The selection of valves V3 through V8 determines how many filters are placed in parallel with filter canister F1.

Once these valves are set, pump 18 will draw IPA from reservoir 16 through valve V1 (ports 1 and C) and through valve V10 (ports 1 and C). The IPA is then pumped through valve V2 (ports 1 and C) to the inlet of filter canister F1. Depending upon the number of filters selected, the IPA can also be supplied through valves V3, V4 or V5 to the inlets of filter canisters F2, F3 or F4. If pressure at the inlet to filter canister F1 is excessive, pressure regulator 30 will bypass the system and return IPA directly to the reservoir 16.

The IPA is pumped through filter canister F1 (and/or filter canisters F2–F4) and will circulate back to the common port C of valve V9. The returning IPA will then circulate through valve V9 (ports C and 1) to return to reservoir 16. This circulation will be augmented by parallel flow from filter canisters F2 through F4 depending on the state of valves V6, V7 and/or V8. With this circulation, IPA is reused and is neither consumed nor wasted. The circulation of the IPA facilitates quick wetting of the filters 14.

Next in step ST7 (FIG. 4) the controller PLC (FIG. 3) reads its various inputs. Specifically, controller PLC determines whether start/stop switch S4 has been actuated. Actuation of that switch would indicate a desire by the operator to terminate the cycle. Also controller PLC monitors the level of IPA through terminal LS as applied to the controller PLC through amplifier A1. An unacceptably low level of IPA would also indicate that the cycle should stop. The controller PLC can also monitor the resistivity signal RS through amplifier A2 but does not do so during this phase since resistivity is not then relevant.

If any of the inputs to controller PLC indicate a need to terminate, control is transferred through step ST8 to the stop function at step ST9, where the solenoids at the outputs Y0–Yn and Yp of controller PLC are restored to their initial conditions. Specifically, the pump P is stopped and all valves are placed into their closed position. Optionally, in step ST9, the operator can request the controller to perform a drain function, as needed. For example, the operator can open valves to drain the IPA in the system back to reservoir 16.

If however, no fault conditions were detected in step ST8, control is transferred to step ST10. In step ST6 a timer was set to determine the length of the phase that is about to be executed. If the timer set in step ST6 has not expired, control is transferred to step ST11, which displays the time elapsed for this phase. If nothing changes, steps ST7 through ST11 cycle without further effect.

Eventually, the timer set in step ST6 will expire and control will transfer to step ST12, which determines whether there are additional phases to be executed. Since more phases are scheduled at this time, control is returned to step ST6.

Step ST6 now sets the various valve solenoids, pump solenoids and timers in preparation for the subsequent phase. The system valves V1, V2, V9 and V10 are set as indicated in the second status column in Table 1, above. Specifically, the states of valves V1 and V2 are changed to provide a flow between ports C and 2. Also, valve V9 is shut off, while valve V10 remains unchanged. Valves V3 though V8 remain in the same state as before.

With these settings, pump 18 now draws from the outlet of filter canister F1 (and the selected ones of canisters F2 through F4). Specifically, IPA is drawn through valve V1 (ports 2 and C), and through valve V10 (ports 1 and C). Pump 18 discharges through valve V2 (ports C and 2) back to the reservoir 16. To prevent a vacuum that would stop the functioning of pump 18, check valves CK1 through CK4 are connected to filter canisters F1 through F4. Thus ambient air can enter the filter canisters as they drain.

Unless a fault is detected in step ST8, steps ST7, ST8, ST10 and ST11 cycle as before until the timer last set in step ST6 expires. This draining phase persists for a time sufficient to allow IPA to drain fully from filter canisters F1–F4. Then, step ST12 transfers control to step ST6, since more phases are to be performed. For the next phase, the valves are set as shown in the third status column of Table 1, above, to initiate a flush phase, using deionized water (DI).

With the valves, timers and the pump set, incoming deionized water (DI) flows through line DI IN through ports 2 and C of valve V10 to the inlet of pump 18. The deionized water DI is then pumped through ports 1 and C of valve V2 to the inlet of filter canister F1 (and the selected ones of canisters F2–F4). With valve V1 off, deionized water now flows through ports C and 2 of valve V9 and through resistivity sensor 24 to leave through outlet line DI OUT.

The steps ST7, ST8, ST10 and ST11 will cycle as before. In this cycling however, the resistivity sensor 24 (FIG. 2) may indicate that the resistivity is low when the residual IPA has been sufficiently flushed from the filter canisters F1 through F4. Accordingly, step ST10 will monitor both resistivity and the state of the software timer. Upon either event, the program will branch to step ST12, returning control to step ST6 for the last phase, corresponding to the last column of Table 1, above.

Once the valves and timer have been set, pump 18 now pumps DI through ports 1 and C of valve V2, to the filters canisters F1 through F4, as appropriate. The deionized water will at least partially return to the pump through valve V1 (ports 2 and C) and valve V10, ports 1 and C. The deionized water at the outlet of the filter canisters F1 through F4 is, however, under pressure and a portion thereof will exit through ports C and 2 of valve V9.

This circulation and draining of DI will continue until the timer set in step ST6 expires, at which time step ST10 will transfer control to step ST12. Step ST12 at this time will determine that all four phases of the operation have been completed and then transfer control to step ST9. Consequently, pump 18 will be stopped and the valves will be restored to their initial condition. Also, the lamp L2 (FIG. 3) will be extinguished.

The appropriate display will now be established through step ST3 and the initial operator menu will be invoked at step ST4. As desired, the operator can now set up a new run with a different number of filters and different dwell times. Alternatively, the operator can simply remove the filters in canisters F1 through F4, reinserting new filters and then treating them in the manner just described.

In some instances, the next filters to be treated are already wet and simply need to be flushed with DI. When this is desired, the function sequence just described will be modified by the operator in step ST5, wherein the operator can indicates that only a DI flush is required. Under those circumstances the program will skip the steps of the first two status columns of Table 1, above, and start by executing the phase of the third status column of Table 1. The system will then perform the last two phases in the manner just described.

When the operator is done using the system power may be removed by momentarily depressing either switch S1 or S2, which removes power from relay coil K to open the normally open relay contacts K1 and K2. This extinguishes lamp L1 and disables the power supply 34, so that controller PLC no longer has power on line VAC.

It is appreciated that various modifications may be implemented with respect to the above described, preferred embodiment. For example, more than one pump can be used depending upon the desired capacity or for the purpose of dedicating a pump to a single purpose or single fluid. Likewise, the rating, capacity and power of the illustrated pump can be varied depending upon the system capacity, the speed of operation, etc. Also, the resistivity sensor is optional. While solenoid controlled pneumatic valves are illustrated for controlling the pump and the system valves, in other embodiments different types of control valves may be used instead. Moreover, while one to four valve canisters are selectable in this embodiment, in other embodiments a different number may be employed instead. Instead of IPA, other wetting agents may be used depending upon the type of filter, the desired volatility, wetting ability, etc. In still other embodiments, a fire control system may be installed in the housing holding the apparatus to automatically extinguish fires. The various check valves may in some installations be replaced with an electrically or pneumatically controlled valve.

Obviously, many modifications and variations of the present invention are possible in light of the above teachings. It is therefore to be understood that within the scope of the appended claims, the invention may be practiced otherwise than as specifically described.

I claim:

1. Apparatus for prewetting and flushing at least one filter with a wetting agent and a flushing liquid, comprising:
   a container means for holding at least one filter loaded therein; and
   a flow arrangement including:
   a storage vessel for holding said wetting agent;
   circulating means connected to said container means for:
      (a) circulating said wetting agent through said container means to wet said at least one filter during an initial phase, and (b) applying pressure to mobilize said wetting agent beyond mobilization caused by gravity in order to drain said wetting agent during a subsequent phase into said storage vessel; and
   flushing means connected to said container means for flushing said flushing liquid through said container means.

2. Apparatus according to claim 1 wherein said circulating means is operable in said subsequent phase to drain said wetting agent without delivering any more to said container means.

3. Apparatus according to claim 2 wherein said container means comprises:
   vent means for venting said container means during said subsequent phase.

4. Apparatus according to claim 2 wherein said container means comprises:
   a check valve for venting said container means to atmosphere during said subsequent phase in response to negative pressure in said container means.

5. Apparatus according to claim 2 wherein said flushing means is operable to conclude by draining said flushing liquid without delivering any more to said container means.

6. Apparatus according to claim 1 wherein said flushing means is operable to conclude by draining said flushing liquid without delivering any more to said container means.

7. Apparatus according to claim 1 wherein said storage vessel is coupled to said container means for supplying thereto, and receiving therefrom said wetting agent.

8. Apparatus according to claim 7 wherein said circulating means comprises:
   a pump communicating between said container means and said storage vessel for circulating said wetting agent.

9. Apparatus according to claim 8 wherein said container means comprises:
   a plurality of canisters adapted to hold said at least one filter; and
   selection means for connecting a selectable number of said canisters in parallel.

10. Apparatus according to claim 9 comprising:
    a pressure regulator coupled to said container means for regulating pressure thereat.

11. Apparatus according to claim 10 wherein said flow arrangement comprises:
    a plurality of pneumatically operated system valves; and
    a plurality of solenoid operated, pneumatic valve actuators separately coupled to said system valves for operating them.

12. Apparatus according to claim 1 comprising:
    a pump communicating with said container means for circulating said flushing liquid through said container means while bleeding some of said flushing liquid away.

13. Apparatus according to claim 1 wherein said flow arrangement comprises:

control means coupled to said container means for switching the flow in said container means between said wetting agent and said flushing liquid.

14. Apparatus according to claim 13 wherein said control means is selectively operable to preclude operation of said circulating means in order to subject said at least one filter in said container means to said flushing liquid without subjecting said at least one filter to said wetting agent.

15. Apparatus according to claim 13 wherein said control means is operable to automatically activate said flushing means, after operation of said circulating means.

16. Apparatus according to claim 15 wherein said control means is operable to reduce flow of said flushing liquid through said container means after a predetermined flow limit condition is exceeded.

17. Apparatus according to claim 15 wherein said control means is operable to switch automatically from said wetting agent to said flushing liquid after expiration of a predetermined time interval.

18. Apparatus according to claim 17 comprising:

a resistivity sensor coupled to said control means and communicating with said container means for providing a resistivity signal signifying the resistivity of said flushing liquid flowing through said container means, said control means being operable to reduce the flow of said flushing liquid through said container means in response to said resistivity signal.

19. Apparatus according to claim 17 comprising:

manually actuatable means for providing a run signal, said control means being operable to start a flow of said wetting agent in said container means in response to said run signal.

20. Apparatus according to claim 1 wherein said flow arrangement comprises:

programmable means coupled to said container means for switching the flow in said container means between said wetting agent and said flushing liquid.

21. Apparatus according to claim 20 wherein said programmable means comprises:

a keyboard for providing operator input.

22. Apparatus according to claim 21 wherein said programmable means is operable to change operational mode in response to elapsing of a predetermined time limit, said keyboard being operable to change said predetermined time limit.

23. Apparatus according to claim 21 wherein said keyboard is selectively operable to inactivate said circulating means in order to subject said at least one filter in said container means to said flushing liquid without subjecting said at least one filter to said wetting agent.

24. Apparatus according to claim 20 comprising:

signaling means for providing an operational signal signifying operational status, said programmable means being operable to repetitively read said operational signal.

25. Apparatus according to claim 24 wherein said programmable means is operable in response to said operational signal to end operation of that one of said circulating means and said flushing means, which is prevailing.

26. Apparatus according to claim 20 comprising:

level means mounted at said storage vessel for providing a level signal signifying a low level of said wetting agent in said storage vessel, said programmable means being operable in response to said level signal to end operation of that one of said circulating means and said flushing means, which is prevailing.

27. A method for prewetting and flushing at least one filter in a container assembly with a flushing liquid and a wetting agent, comprising the steps of:

loading said at least one filter in said container assembly;

circulating said wetting agent through said container assembly in an initial phase;

draining and storing said wetting agent in a subsequent phase, using a pressure for mobilizing said wetting agent beyond mobilization caused by gravity;

flushing said flushing liquid through said container assembly without opening said container assembly; and removing said at least one filter from said container assembly.

28. A method according to claim 27 wherein the step of draining said wetting agent is performed without delivering any more to said container assembly.

29. A method according to claim 28 wherein the step of draining said wetting agent is performed by venting said container assembly during said subsequent phase.

30. A method according to claim 28 wherein the step of draining said wetting agent is performed by venting said container assembly to atmosphere during said subsequent phase to relieve negative pressure in said container assembly.

31. A method according to claim 28 wherein the step of flushing said container assembly is concluded with the step of:

draining said flushing liquid without delivering any more to said container assembly.

32. A method according to claim 27 wherein the step of flushing said container assembly is concluded with the step of:

draining said flushing liquid without delivering any more to said container assembly.

33. A method according to claim 27 wherein the step of circulating said wetting agent is performed in circuit with a supply of said wetting agent.

34. A method according to claim 33 comprising the step of:

ending prewetting if the level of said wetting agent in said reservoir falls below a predetermined limit.

35. A method according to claim 33 the step of:

reducing the flow of said flushing liquid through said container assembly in response to resistivity of said flushing liquid passing a predetermined threshold.

36. A method according to claim 27 wherein the step of flushing said container assembly is performed by circulating said flushing liquid through said container assembly while bleeding some of said flushing liquid away.

37. A method according to claim 27 wherein the steps of circulating said wetting agent and flushing said flushing liquid are performed according to a predetermined schedule.

38. A method according to claim 27 wherein the step of loading said container assembly is performed by loading said at least one filter together with at least an additional filter into said container assembly.

39. A method according to claim 27 wherein said wetting agent comprises an alcohol.

40. A method according to claim 39 wherein said wetting agent comprises isopropyl alcohol.

41. A method according to claim 27 wherein the step of circulating said wetting agent is terminated after delivery of said wetting agent to a predetermined extent.

42. A method according to claim 41 wherein the step of flushing said flushing liquid through said container assembly is followed by the step of:

reducing the flow rate of said flushing liquid after a predetermined flow limit condition is exceeded.

43. A method according to claim 42 wherein the step of circulating said wetting agent is terminated after expiration of a predetermined time interval.

44. A method according to claim 42 wherein the step of reducing the flow rate of said flushing liquid is started upon the resistivity of said flushing liquid flowing through said container assembly reaching a predetermined threshold.

* * * * *